United States Patent
Yoon et al.

(10) Patent No.: US 8,341,659 B2
(45) Date of Patent: *Dec. 25, 2012

(54) MULTIMEDIA SERVICE SYSTEM BASED ON USER HISTORY

(75) Inventors: Kyoung Ro Yoon, Seoul (KR); Jin Soo Lee, Seoul (KR); Sung Bae Jun, Seoul (KR)

(73) Assignee: LG Electronics, Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/954,471

(22) Filed: Nov. 24, 2010

(65) Prior Publication Data

US 2011/0072054 A1  Mar. 24, 2011

Related U.S. Application Data

(63) Continuation of application No. 11/008,676, filed on Dec. 10, 2004, now Pat. No. 7,853,967, which is a continuation of application No. 09/903,650, filed on Jul. 13, 2001, now Pat. No. 7,712,113.

(30) Foreign Application Priority Data

Jul. 13, 2000 (KR) .................................. 40276/2000

(51) Int. Cl.
*H04H 60/33* (2008.01)
*H04H 60/32* (2008.01)
(52) U.S. Cl. ............................................. 725/9; 725/14
(58) Field of Classification Search ........................ 725/9
See application file for complete search history.

(56) References Cited

U.S. PATENT DOCUMENTS

| | | | |
|---|---|---|---|
| 4,697,209 A | 9/1987 | Kiewit et al. |
| 5,062,045 A | 10/1991 | Janis et al. |
| 5,444,499 A | 8/1995 | Saitoh |
| 5,717,859 A | 2/1998 | Yunoki |
| 5,724,521 A | 3/1998 | Dedrick |
| 5,778,182 A | 7/1998 | Cathey et al. |
| 5,845,276 A | 12/1998 | Emerson et al. |
| 6,201,538 B1 | 3/2001 | Wugofski |
| 6,349,410 B1 | 2/2002 | Lortz |
| 6,449,632 B1 | 9/2002 | David et al. |

(Continued)

FOREIGN PATENT DOCUMENTS

JP            10320413 A    12/1998

OTHER PUBLICATIONS

CineImage, vol. 7, No. 1, Mar. 2000, http://www.cinemage.com/news1/mar2000/.

(Continued)

*Primary Examiner* — Justin Shepard
(74) *Attorney, Agent, or Firm* — Sidley Austin LLP

(57) ABSTRACT

Disclosed is a user history based multimedia service system, wherein user history data include a multimedia consumption type and/or consumption behavior of the user. The consumption type data includes a start time or end time of the multimedia content consumption (i.e., simple view data), content recording time and format, content backup time and format, and content transfer time and format. The consumption behavior data includes a content access/play data such as a normal finish, skimmed, skipped, slowed, or replay, and a stopped data of the content access/play. The consumption type or consumption behavior data include information on program identification and information on access to the consumption type/consumption behavior data. The respective data is provided for each user and program.

12 Claims, 4 Drawing Sheets

U.S. PATENT DOCUMENTS

| | | |
|---|---|---|
| 6,631,523 B1 | 10/2003 | Matthews et al. |
| 6,697,792 B2 | 2/2004 | Bunney et al. |
| 6,704,929 B1 | 3/2004 | Ozer et al. |
| 6,727,914 B1 | 4/2004 | Gutta |
| 6,745,367 B1 | 6/2004 | Bates et al. |
| 6,813,775 B1 | 11/2004 | Finseth et al. |
| 6,983,478 B1 | 1/2006 | Grauch et al. |
| 7,051,352 B1 | 5/2006 | Schaffer |
| 7,069,571 B1 | 6/2006 | Del Sesto et al. |
| 7,150,030 B1 | 12/2006 | Eldering et al. |

OTHER PUBLICATIONS

CIDF Website—Publication Date Mar. 8, 2000—http://web.archive.org/web/20000308214921/cidf.org/english.html.

FIG.2

```
simple view data=(end time) or (start time)
recording data=(recording time, recording format)
backup data=(backup time, storage format)
transfer data=(transfer time, transfer format)
```
---
```
normal finish data=(0 or 1)
skimmed data=(start of section, end of section) or (start of
                section, length of section)
skipped data=(start of section, end of section) or (start of
                section, length of section)
replay data=(start of section, end of section) or (start of
                section, length of section)
slowed play data=(start of section, end of section) or (start of
                section, length of section)
stopped data=(stop position identifier)
```

FIG. 3

```
<complexType name="RecordOrTransferHistory">
    <element name="ActionTime" type="mds:TimePoint"
        minOccurs="0"/>
    <element name="ActionFormat" type="mds:MediaFormat"
        minOccurs="0"/>
</complexType>

<complexType name="ConsumptionType>
    <element name="SimplyPlayed" type="mds:TimePoint"
        minOccurence="0"maxOccurence="unbounded"/>
    <element name="Recorded" type="mds:RecordOrTransferHistory"
        minOccurence="0"maxOccurence="unbounded"/>
    <element name="Backedup" type="mds:RecordOrTransferHistory"
        minOccurence="0"maxOccurence="unbounded"/>
    <element name="Transferred" type="mds:RecordOrTransferHistory"
        minOccurence="0"maxOccurence="unbounded"/>
    <element name="ReferenceToProgram" type="mds:ReferenceToProgram"
        minOccurs="1"/>
    <attribute name="protection" type="Boolean" use="default"
        value="true"/>
</complexType>

<complexType name="ConsumptionBehavior>
    <element name="NormalFinish" type="xml:boolean" minOccurs="0"/>
    <element name="Skimmed" type="mds:MediTime"
        minOccurs="0"maxOccurs="unbounded"/>
    <element name="Skipped" type="mds:MediaTime"
        minOccurs="0"maxOccurs="unbounded"/>
    <element name="slowed" type="mds:MediaTime"
        minOccurs="0"maxOccurs="unbounded"/>
    <element name="Replayed" type="mds:MediaTime"
        minOccurs="0"maxOccurs="unbounded"/>
    <element name="Stopped" type="mds:MediaTimePoint"
        minOccurs="0"/>
    <element name="ReferenceToProgram" type="mds:ReferenceToProgram"
        minOccurs="1"/>
    <attribute name="protection" type="Boolean" use="default"
        value="true"/>
</complexType>

<complexType name="UsageHistory">
    <element name="ConsumptionType" type="mds:ConsumptionType"
        minOccurs="0"maxOccurs="unbounded"/>
    <element name="ConsumptionBehavior" type="mds:ConsumptionBehavior"
        minOccurs="0"maxOccurs="unbounded"/>
    <attribute name="allowAutomaticUpdate" type="boolean"
        use="default" value="true"/>
</complexType>
```

MULTIMEDIA SERVICE SYSTEM BASED ON USER HISTORY

CROSS REFERENCE TO RELATED APPLICATION

The present application is a continuation of co-pending U.S. application Ser. No. 11/008,676, filed Dec. 10, 2004, which is a continuation of U.S. application Ser. No. 09/903,650, filed Jul. 13, 2001, now U.S. Pat. No. 7,712,113, which claims priority to and the benefit of Korean Patent Application No. 40276/2000 filed in the Korean Intellectual Property Office on Jul. 13, 2000, the entirety of which is incorporated by reference herein.

BACKGROUND OF THE INVENTION

1. Field of the Invention

The present invention relates to a multimedia service system and more particularly, to a user history based multimedia service system for providing user-oriented multimedia service, and a method for incorporating user history data for the history based multimedia service.

2. Description of the Related Art

Recently, as various attempts to provide user-oriented multimedia services are actively made in multimedia service systems, various techniques of observing the user's multimedia consumption pattern and reflecting user preferences on the multimedia service.

Also, as the digital broadcasts have been started, additional functions using the user preferences have been introduced as a very important factor.

For instance, in providing a help function to users, is a technique of providing a user interface suitable for each user using a usage history describing what items the user mainly searches in ordinary circumstances.

According to this technique, if a portion of the multimedia has a low level as compared to a tree structure, but it is frequently searched by the user, its level is adjusted to be a higher level, and thus it shortens a path for searching the desired portion.

As another conventional technique, there is a method of defining a user function. This technique provides a user-oriented interface by setting functions of respective buttons to those desired by the user when a graphic user interface is used.

Still another conventional technique proposes a multimedia search and display method, which extracts user preferences using the user history information of the multimedia content consumption, and reflects this user preference information on the multimedia search and display.

For instance, a user's display operation such as 'replay', 'fast forward', etc., has been recorded, and the user preference scores are described for each segment of the multimedia content. This user preference information is then reflected on the multimedia display to provide an intelligent display function.

This method enables the display control operation reflecting the user preference by considering a section where the 'replay' operation frequently occurs as a more important segment and displaying the section more slowly when searching the section.

Still another conventional technique records a "device information" such as user's preferred channel and sound level (i.e., volume) for each channel and so on, and provides a viewing environment suitable for the user using the recorded preferred channel and sound level information.

Still another conventional technique proposes a method that does not transfer massive program guides as they are, but provides the program guides based on the user preferred program genre.

The user preference for such a program genre is determined by recording the user's ordinary viewing content and extracting a user's habit therefrom.

Still another conventional technique proposes a system for automatically selecting a user preferred program using a user's multimedia viewing history, and recording the selected program.

This kind of user-oriented service has already been commercialized by 'Tivo' in the United States.

Recently, a smart card has been introduced to provide more user-oriented service, other than server-oriented or device oriented condition.

For example, a method for recording the user preference information in a smart card, and consistently providing the user dependent service without being affected by the server or device has been proposed.

In the meantime, most of the useful functions as described above are performed based upon the history record of the user's consumption of the multimedia a content.

That is, the preference information is extracted by checking the user's multimedia content consumption and recording the pattern or habit of the user by a numerical value.

In case of recording the user's consumption pattern by the numerical value as described above, whole history from a time point when the user started the consumption through the present should be reflected.

However, expressing the user history by only a specified numeral value has limitations in reflecting the user history for a certain period of recent.

Also, under certain circumstances, a sequential history itself may be used. In this case, there is a problem that a series of records for the sequential consumption should be preserved in the form of a list.

This method is the same as that of a history used in the existing Internet browser such as 'Netscape' and so on.

The history of the 'Netscape' can preserve its record by arranging addresses of the consumed multimedia contents, i.e., documents.

However, it is desirable that the history information for the above-described purpose should describe additional feature information such as metadata of the consumed multimedia content as well as positional information of the multimedia content.

For example, in case of the record using a moving picture, not only the position and title of the corresponding moving picture but also various feature information of the moving picture such as a genre, actor/actress, director, etc., should be described to extract the user preference information by reflecting such information.

In order to describe all the information as described above in the history list, however, the waste of space becomes severe due to the duplicated information, and thus it is difficult to manage such information in a storage medium of a limited-capacity such as the smart card.

Also, as the amount of content to be once recorded becomes larger, the content accessing speed becomes lower.

Accordingly, in the next-generation multimedia-related applications where the feature information such as the metadata other than the content is considered as important factors, more effective content structure and its management method are required to effectively manage such feature information as the history data.

In the meantime, in order to provide the effective user-oriented service as described above, the history should include all the metadata, user's consumption pattern, etc., or should be easily accessed to the storage medium.

Also, as the protection of the intellectual property right of the content is regarded as an important issue, a technique that can keep the predetermined method and number of consumption is required when respective multimedia contents are provided.

The conventional techniques are dependent upon the multimedia content when the multimedia service is performed based on the user history and/or user preference.

For example, they provide the service in a manner that in case of the moving picture service, they obtain weighted values of the user preferred genre, director, actor/actress, program, etc. of the content as the preference information, and reflect the preference information on the next moving picture service, so that the search of the user preferred genre, director, actor/actress, program, etc. can be easily performed when the moving picture is searched. This is just the preference information dependent upon only the attribute of the multimedia content itself.

However, it is doubtful that only the multimedia-content-dependent elements are to be considered when the user receives the above-described multimedia service. That is because every user has a different consumption pattern or habit as a natural person, and a different consumption type even with respect to the same multimedia service.

For instance, assuming that a user views a movie using an on-line multimedia service, the conventional technique merely establishes the history information dependent upon the multimedia content, for example, of which genre the movie is, who the director is, who appear as actors/actresses, etc.

However, the user may simply view the multimedia content (i.e., the movie), record (backup) the content in a storage medium such as a video tape, or transfer the content to another place using a network. This is subject to the consumption type, i.e., how the user consumes the provided multimedia content, and is not dependent upon the attribute of the multimedia content at all, but is just dependent upon the user's human nature.

Also, the user may change his/her behavior in accessing/viewing the content such as a slowed view of a concerned portion, skimmed view or skipped view of an unconcerned portion, etc. This is subject to the consumption behavior, i.e., on what behavior the user consumes the provided multimedia content, and is not dependent upon the attribute of the multimedia content at all, but is just dependent upon the user's human nature.

However, according to the conventional multimedia content service techniques based on the user history, the history information is established only for the elements dependent upon the multimedia content without considering above described points.

SUMMARY OF THE INVENTION

Therefore, an object of the invention is to solve the above problems and/or disadvantages and to provide at least the advantages described hereinafter.

An object of the present invention is to provide a user history based multimedia service system for providing more user-oriented multimedia service by reflecting user history data.

It is another object of the present invention to provide a user history based multimedia service system that can extract a user preference for the multimedia content using user history data.

It is still another object of the present invention to provide a user history based multimedia service system that can perform control operations such as restriction, prohibition, permission, etc., for access to the multimedia content using user history data and protect intellectual property right on the multimedia content.

Further object of the present invention is to provide various user history data for user-oriented multimedia service.

Still further object of the present invention is to provide an effective method for incorporating user history data that can store various user history data in limited storage space.

In one aspect of the present invention, there is provided a user history based multimedia service system for providing user-oriented multimedia content service, wherein the system provides the multimedia content to a client, records a user consumption pattern corresponding to the provided multimedia content, and controls a multimedia content service based on the recorded user consumption pattern.

The present invention provides user history data that describes a user's consumption pattern corresponding to a multimedia content provided by a content provider (i.e., server).

The user history data describing the user's consumption pattern includes a consumption type or a consumption behavior corresponding to the provided multimedia content.

The user history data describing the user's consumption pattern is used for extracting user preference data corresponding to the provided multimedia content, or protecting intellectual property rights with respect to consumption of the provided multimedia content.

In another aspect of the present invention, there is provided a user history based multimedia service system comprising a user history storage device for storing a consumption type and/or a consumption behavior of a multimedia content, and a control means for controlling operations such as restriction, prohibition, permission, billing, etc., on the consumption of the multimedia content using consumption type data and/or consumption behavior data stored in the user history storage device.

In still another aspect of the present invention, there is provided a user history based multimedia service system comprising a user history storage device for storing a consumption type and/or a consumption behavior of a multimedia content, and a means for extracting user preference data on the consumption of the multimedia content using the consumption type data and/or consumption behavior data stored in the user history storage device.

In still another aspect of the present invention, there is provided a method for incorporating user history data comprising assigning a content reference for accessing a content or metadata of the content, and recording a user consumption pattern (i.e., consumption type and/or consumption behavior) of the content.

In the present invention, the consumption type is at least one of a simple view for one time accessing/viewing of the multimedia content, storage (i.e., recording/backup) of the content, and transfer of the content through a network.

In extracting user preference from consumption types of a simple view, recording, backup, and transfer, higher preference is assigned to a consumption type of higher consumption frequency, while lower preference is assigned to a consumption type of lower consumption frequency.

In extracting user preference from consumption types of a simple view, recording, backup, and transfer, higher preference is assigned to a multimedia content of higher consumption frequency, while lower preference is assigned to the multimedia content of lower consumption frequency.

In the present invention, the consumption behavior is at least one operation of a normal finish, skimming, replay, skipping, slow play, and stop.

In extracting user preference from consumption behavior data, higher preference is assigned to a section described as the skimmed or skipped, while lower preference is assigned to a section described as the replay or slowed.

In the present invention, the user history storage device is a movable storage medium such as a smart card.

In the present invention, the user history data further includes information representing whether the consumption type and/or consumption behavior has been automatically updated.

In the present invention, the user history data further includes information for permitting, prohibiting, or restricting an access to the stored data. In the present invention, intellectual property rights on the multimedia content can be protected by control operations such as restriction (i.e., prohibition, partial permission, or full permission) or billing for consumption of the multimedia content by comparing the data recorded in the user history with a predetermined condition for consumption of the multimedia content provided to the user.

BRIEF DESCRIPTION OF THE DRAWINGS

The invention will be described in detail with reference to the following drawings in which like reference numerals refer to like elements wherein:

FIG. 2 is an exemplary view illustrating a method for incorporating a user history data according to the present invention;

FIG. 3 is a view illustrating the user history data of FIG. 1 and FIG. 2 as an XML schema.

DETAILED DESCRIPTION OF THE PREFERRED EMBODIMENTS

Hereinafter, preferred embodiments of the present invention will be described in detail.

Figure 1:
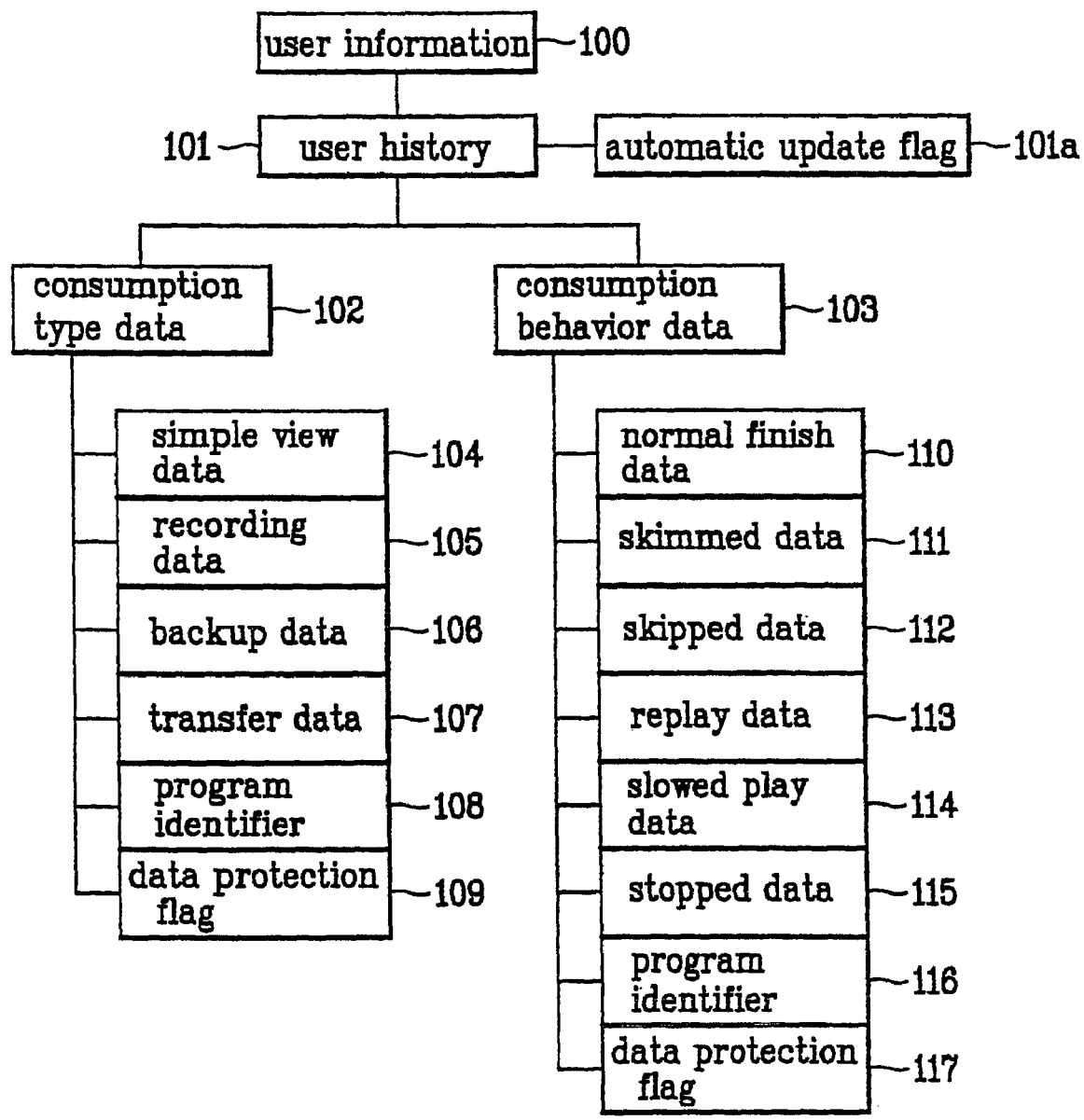
FIG. 1 is an exemplary view illustrating a user history data structure according to the present invention.

FIG. 1 shows an example of a user history data structure according to the present invention. FIG. 2 shows an example of the consumption type and consumption behavior expressed in FIG. 1. FIG. 3 shows an XML schema representation of the user history data of FIG. 1 and FIG. 2.

A multimedia content server (i.e., provider) provides a desired multimedia content to a client (i.e., user) through a medium such as a network. A receiving device, which received the multimedia content, reproduces and displays the multimedia content data, and using a user interface it performs a content processing for the consumption type or consumption behavior desired by the user. At this time, the history of the consumption type or consumption behavior is recorded in a movable storage medium such as a smart card.

The user history according to the present invention includes user information 100 for describing that this data is of a specified user, user history description information 101 for describing that this information is for describing a history for each user, a consumption type data 102 for describing the user's consumption type for the provided multimedia content, and a consumption behavior data 103 for describing the user's consumption behavior for the provided multimedia content.

Also, the user history according to the present invention further includes an automatic update flag 101a for setting whether to automatically update the history of each user.

If the automatic update flag 101a is set to 'automatic update', the consumption details are automatically updated whenever the user consumes the multimedia content.

The consumption type data 102 includes a simple view data 104, recording data 105, backup data 106, transfer data 107, program identifier 108 as a content reference, and a data protection flag 109 for describing whether to protect the consumption type data.

The consumption type data 102 may be created for each multimedia content, and a user may have a plurality of different data structures on its lower layer. The program identifier 108 is given for each content, and the data protection flag 109 is given for each content or for the whole history for each user.

The simple view data 104, recording data 105, backup data 106, and transfer data 107 may be created whenever the consumption type is produced, and recorded as a plurality of data structures for each content.

The consumption behavior data 103 includes a normal finish data 110, skimmed data 111, skipped data 112, replay data 113, slow play data 114, stopped data 115, program identifier 116 as a content reference, and a data protection flag 117 for describing whether to protect the consumption behavior data.

The consumption behavior data 103 may be created for each multimedia content, and a user may have a plurality of different data structures on its lower layer. The program identifier 116 is given for each content, and the data protection flag 117 is given for each content or for the whole history for each user.

The normal finish data 110, skimmed data 111, skipped data 112, replay data 113, slow play data 114, and stopped data 115 may be created whenever the consumption behavior is produced, and recorded as a plurality of data structures for each content.

The user's consumption type is a kind of the user's consumption pattern of the multimedia contents, and describes for what purpose the user consumes the provided multimedia content.

The consumption type data 102 describes the occurrence time for consumption of the multimedia content when the multimedia content is consumed, and is used for protecting the intellectual property right of the content by comparing the consumption type consented between the content provider and the user with the consumption type data 102.

Specifically, the occurrence time for consumption of the multimedia content is recorded in accordance with the consumption type such as the simple view, recording, backup, transfer, etc., to recognize the number (i.e., frequency) of consumption for respective consumption type. If the permitted number of consumption is restricted by any intellectual property for each consumption type, the user history is checked after the consumption is performed for the predetermined number of times to restrict an additional consumption, bill an additional charge, or permit the additional consumption by payment of the additional charge.

Also, in case of an unallowable consumption type, i.e., in case that the recording is permitted, but the backup or transfer is not permitted, the backup or transfer may be restricted.

The simple view data 104 is provided for the purpose of one time viewing of the multimedia content transferred in the form of broadcast or stream without storing the content for repeated viewing.

At this time, the content storage for supporting a function such as a temporary stop can occur, while the temporary storage performed under the assumption that it is deleted after completion of viewing is included in the simple view operation.

As the simple view data 104, the time when the corresponding content terminates or starts can be recorded.

The recording data 105 is provided for storing the multimedia content in a storage device of the receiver for the purpose of repeated viewing after the multimedia content is received.

For example, when the simple view terminates in the receiver, it is determined whether to store the content. If the storage is not desired, the stored content is removed. If the storage is desired, the recording is performed to store the content in a non-volatile storage device, and the stored content is registered in a content list for management.

As the recording data 105, a recording time and a recording format can be recorded.

The backup data 106 is provided for recording the received content or pre-stored content in a movable medium using an external storage device other than the receiver.

As the backup data 106, a backup time and a storage format can be recorded.

The transfer data 107 is provided for describing transfer of the stored content to an external third party using a network.

As the transfer data 107, a transfer time and a transfer format can be recorded.

In view of the intellectual property, the above-described operations such as the recording, backup, transfer, etc., have different meanings. Also, the quality of the multimedia content resulting from the operations such as the recording, backup, transfer, etc., the compression format or transfer format used during the backup or transfer, and used parameters have various meanings.

For example, the multimedia content provider may not permit the storage, backup, or transfer of the same quality as the provided content, and in case of a moving picture such as a movie having a format that supports only limited level of the quality, the transfer or backup may be permitted without any limitation. Thus, when the history for each consumption type is stored, it is necessary to store both the operation time and the media-format related information of the result of operation.

If there exists consumption type data of the content to be stored in the history and its corresponding consumption type restriction information that is consented by the provider, the receiver may restrict the user's consumption of the content by comparing the consumption type restriction information with the consumption type data.

The above process will be explained later in detail with reference to FIG. 4.

Meanwhile, the user's consumption behavior is another kind of the user's consumption pattern of the multimedia contents, and describes how the user consumes the provided multimedia content.

The consumption behavior for each portion of the multimedia content is recorded when the user consumes the multimedia content, and the various user's preference can be extracted based on the consumption behavior. So, it is possible to provide more user-oriented multimedia service based on the extracted user preference.

Specifically, by recording on which portion of the content the respective consumption behavior such as the normal finish, skimming, skipping, slow play, replay, stop, etc., occurs, a portion specially concerned by the user or a portion unconcerned by the user can be analogized. Also, user-preferred metadata can be extracted by extracting the metadata based on the consumption behavior.

The normal finish data 110 is information on a flag for recording whether the content is viewed to the end, and the skimmed data 111 is provided for recording a section of the selected content that has passed by the skimmed operation.

The normal finish data 110 is recorded only whether the normal finish is effected or not (i.e., '0' or '1').

The skipped data 112 is provided for recording a section of the selected content that has skipped without viewing by the skipped operation, and the replay data 113 is provided for recording a section of the content that has repeatedly viewed using the function of rewind and so on.

The slow play data 114 is provided for recording a section that has viewed more slowly and thoroughly than a normal speed using the slow play function and so on. The stopped data 115 is provided for recording the stop position in case that the viewing of the content is stopped without finishing the viewing, wherein only the stop position is recorded as a stop position designator.

In the skimmed data 111, skipped data 112, replay data 113, and slow play data 114, the start and end of the corresponding section may be recorded, or the start of the section and length of the section from its start point may be recorded.

In case that the play is restarted to pass through previous stop point, the stop point is deleted from the stopped data 115. If the play is stopped at a new position, this new position is recorded in the stopped data 115, while if the play is finished to the end, the normal finish flag is set and the stopped data is deleted at the same time.

At this time, the normal finish data 110 indicates whether the user has already viewed the content, and thus a negative preference can be extracted using the metadata of the unconcerned section stored in the skimmed data 111 and the skipped data 112.

Also, the section recorded in the replay data 113 and the slow play data 114 is judged to the section that the user was concerned, and it used for extracting a positive preference using the metadata of the section.

This preference extraction data creates the environment that can provide user-oriented service based on the user preference.

The user history of FIG. 1 to FIG. 3 have either the data of the consumption type of the multimedia content provided to the user or the data of the consumption behavior of the multimedia content provided to the user, or both of them.

Figure 4:
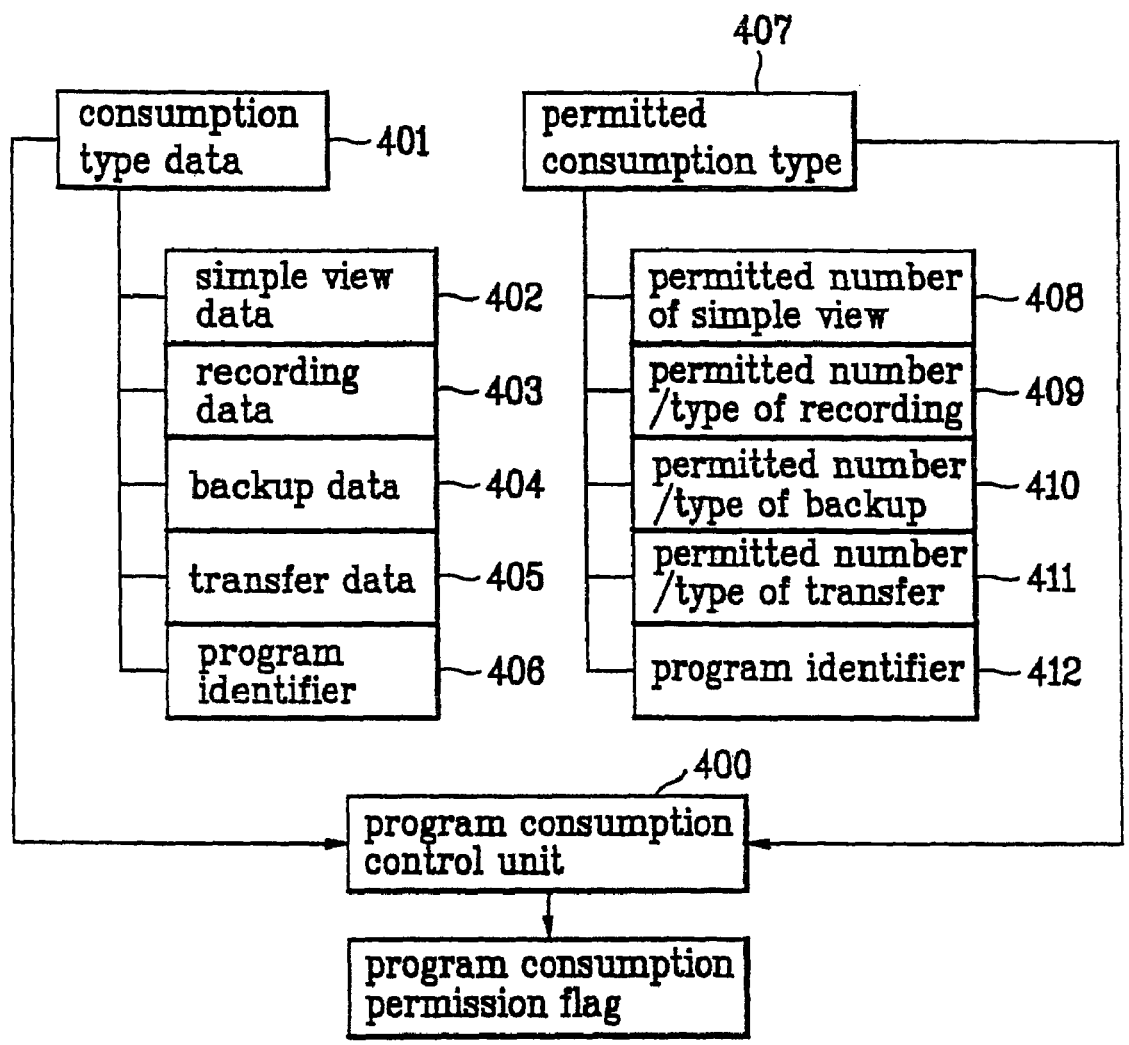
FIG. 4 is an exemplary view illustrating a method of protecting intellectual property rights using the user history data according to the present invention.

FIG. 4 shows an example of the multimedia service system performing the intellectual property management with respect to the multimedia content using the user history data (i.e., consumption type), in case where the user history has the consumption type data of the multimedia content. The system includes a consumption type data and a permitted consumption type, and also includes a control unit for controlling the consumption of the program (i.e., content) by comparing the consumption type data with the permitted consumption type.

This system construction can be also applied to the case that the intellectual property right with respect to the multimedia content is protected using the user history data (i.e., consumption behavior), in case where the user history has the consumption behavior data of the multimedia content.

As described above, the consumption type data 401 includes a simple view data 402, recording data 403, backup data 404, transfer data 405, and program identifier 406.

The permitted consumption type 407 is provided for permitting the consumption of the multimedia content based on the intellectual property, and includes a permitted number of simple view 408, permitted number/type of recording 409, permitted number/type of backup 410, permitted number/type of transfer 411, and program identifier 412.

A program consumption control unit 400 compares the consumption type data 401 and the permitted consumption type 407, and the consumption type is restricted to the permitted type in accordance with a result of comparison.

If the user receives the corresponding content from the content provider along with the information such as the permitted number of simple view, permitted number of recording, permitted number of backup, and permitted number of transfer, and the permitted format of recording/backup/transfer, and if predetermined number of times is applied for each permitted consumption behavior, the receiver can stop the consumption of the corresponding behavior using the consumption behavior data as shown in FIG. 1. Also, the user can easily confirm the whole number of consumption permitted to him/her and the permitted number of consumption. By this method, the consumption of the content that is not desired by the content provider can be controlled, and the protection of the intellectual property can be achieved.

The program consumption control unit 400 may be a server or client.

Meanwhile, the user history based multimedia service system according to the present invention manages the consumption type data and consumption behavior data for each user, manages the consumption type data and consumption behavior data grouped for each content, and preserves a content reference for each group.

At this time, the content reference uses an independent ID regardless of a storage position of the content such as a digital object ID (DOI), content reference 10 (CRID) of a content ID forum (CIDF), and IMID of an SMPTE, and thus it always enables an unlimited access to the content or related metadata. Accordingly, if needed for the extraction of the user preference data, the metadata that is not provided in the history data can be brought from an external or internal storage device.

As described above, the user history based multimedia service system according to the present invention can perform an effective and discriminated intellectual property right management for each multimedia content by recording the user's consumption type and consumption behavior of the multimedia content for each user, and enables a user-oriented multimedia service by extracting user preference information for the multimedia content from the user's consumption pattern.

Also, the present invention enables the user-oriented service and achieves the above-described purpose independently of a server since it uses the user-oriented information, departing from the existing server-oriented user management.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method implemented by an apparatus for processing user history data, the apparatus including a processor and a storage device, the method comprising:

storing in the storage device a hierarchical user history data structure for describing user history; and extracting user preference information from the stored hierarchical user history data structure, wherein the hierarchical user history data structure comprises:

a user information element including information for identifying a user; and a first user action list and a separate, second user action list that are respective first and second structural elements at the same level in the hierarchical user history data structure for separately recording different first and second user action types of the user's multimedia consumption, wherein the first user action list records prior or current user actions corresponding to the first user action type that includes playing content from multimedia streams and the second user action list records prior or current user actions corresponding to the second user action type that includes skipping content portions of the multimedia streams, each of the first and second user action lists including a respective list of user action data items, wherein each user action data item in the first user action list includes a content reference identifier of a multimedia program which has been played by the user, and wherein each user action data item in the second user action list includes a content reference identifier that identifies a multimedia program a portion of which has been skipped by the user.

2. The method of claim 1, wherein each content reference identifier enables access to content related metadata that is not provided in the hierarchical user history data structure.

3. The method of claim 1, wherein the hierarchical user history data structure further comprises data protection information for indicating whether the user desires to keep information in the user action data items for the user's private use.

4. The method of claim 3, wherein each of the user action data items further includes an operation time indicating when the corresponding user action took place.

5. The method of claim 1, wherein the hierarchical user history data structure further includes an automatic update flag for setting whether the user action history is automatically updated.

6. The method of claim 1, wherein the storage device includes a smart card.

7. An apparatus for processing user history data stored in a storage device, the apparatus comprising:

a processor configured to extract user preference information from a hierarchical user history data structure that includes data describing user history; and a memory configured to store the extracted user preference information, wherein the hierarchical user history data structure comprises:

a user information element including information for identifying a user; and a first user action list and a separate, second user action list that are respective first and second structural elements at the same level in the hierarchical user history data structure for separately recording different first and second user action types of the user's multimedia consumption, wherein the first user action list records prior or current user actions corresponding to the first user action type that includes playing content from multimedia streams and the second user action list records prior or current user actions corresponding to the second user action type that includes skipping content portions of the multimedia streams, each of the first and second user action lists including a respective list of user action data items, wherein each user action data item in the first user action list includes a content reference identifier of a multimedia program which has been played by the user, and wherein each user action data item in the second user action list includes a content reference identifier that identifies a multimedia program a portion of which has been skipped by the user.

8. The method of claim 7, wherein each content reference identifier enables access to content related metadata that is not provided in the hierarchical user history data structure.

9. The method of claim 7, wherein the hierarchical user history data structure further comprises data protection information for indicating whether the user desires to keep information in the user action data items for the user's private use.

10. The method of claim 9, wherein each of the user action data items further includes an operation time indicating when the corresponding user action took place.

11. The method of claim 7, wherein the hierarchical user history data structure further includes an automatic update flag for setting whether the user action history is automatically updated.

12. The method of claim 7, wherein the storage device includes a smart card.

* * * * *